June 9, 1925.  J. A. H. BARKEIJ  1,541,240
POWER TRANSMISSION
Filed May 19, 1924   2 Sheets-Sheet 1

INVENTOR,
Jean A. H. Barkeij
BY A. K. Martell
ATTORNEY.

June 9, 1925.　　　　　J. A. H. BARKEIJ　　　　　1,541,240
POWER TRANSMISSION
Filed May 19, 1924　　　　2 Sheets-Sheet 2

INVENTOR,
Jean A. H. Barkeij
BY
ATTORNEY.

Patented June 9, 1925.

1,541,240

UNITED STATES PATENT OFFICE.

JEAN A. H. BARKEIJ, OF LONG BEACH, CALIFORNIA.

POWER TRANSMISSION.

Application filed May 19, 1924. Serial No. 714,365.

*To all whom it may concern:*

Be it known that I, JEAN A. H. BARKEIJ, a citizen of Holland, residing at Long Beach, in the county of Los Angeles and State of California, have invented new and useful Improvements in Power Transmission, of which the following is a specification.

My invention relates to improvements in power transmissions of the type employed in connection with automobile engines and the like.

The main object of my invention is to provide a power transmission and control in which the gear set is brought to a complete stop before the shift of gears is made thus avoiding all danger of stripping the gears.

Another object is to provide a power transmission in which the gear shifting members are locked against movement, excepting when the brake is applied to stop the gear set.

Another object is to provide a power transmission and control in which the transmission clutches are released, the transmission brake is applied, the throttle is closed and the shifting members are released for action by the simple movement of a pedal, and the shifting members are locked, the throttle is opened, the brake is released and the clutches are applied by the simple release of the pedal.

Other objects and advantages will appear hereinafter and while I show herewith and will describe a preferred form of construction, I desire to be understood that I do not limit myself to such preferred form but that various changes and adaptations may be made therein without departing from the spirit of my invention as hereinafter claimed.

Referring to the drawings which accompany this specification and form a part thereof:

Figure 1:
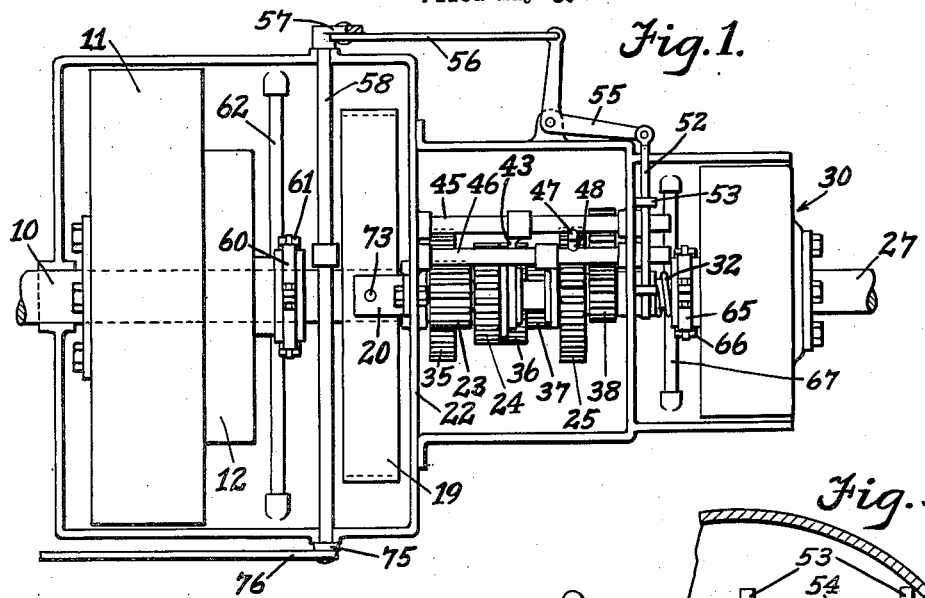
Fig. 1 is a plan view of a transmission embodying the principles of my invention.

As indicated more particularly by the reference numerals in the drawings, the crank shaft 10, with the fly wheel 11 and the friction clutch 12 is of the usual construction, the driven member 13 of the friction clutch being splined to an intermediate shaft 14 between the crank shaft and the gear set driving shaft 15. Intermediate shaft 14 has its front end 16 journaled in the rear end of crank shaft 10, while its rear end 17 serves as a bearing for the front end of the gear set driving shaft 15.

A brake wheel 18 is keyed to the intermediate shaft 14, and a brake band 19, adapted to clamp the brake wheel, is supported by brackets 20 and 21 attached to the transmission casing 22. A gear wheel 23 is keyed to the rear end of intermediate shaft 14.

The gear set driving shaft 15 has the usual shift gears 24 and 25 splined thereon and has a rear extension 26 journaled in the front end of the main drive shaft 27, which has a flange 28 to which the driven member 29 of a rear friction clutch 30 is attached. The driving member 31 of the rear friction clutch is splined to the rear end 26 of the gear set drive shaft.

An expanding helical spring 32, having its forward end resting against a collar 33 on shaft 15 and its rear end pressing against member 31 of the friction clutch, encircles shaft 15 and holds the driving and driven members of friction clutch 30 in operative contact.

A counter shaft 34, having a gear wheel 35 keyed to its front end, and a group of gear wheels 36, 37 and 38 keyed to its rear end, is journaled in the casing parallel to gear set, driving shaft 15. Shaft 15 and counter shaft 34, with the gear wheels mounted thereon and a gear wheel 39, mounted on a stud shaft 40, constitute the gear set of the transmission.

Gear wheel 23 is in constant mesh with gear wheel 35 and gear wheel 38 is in constant mesh with gear wheel 39. The internal gear teeth of gear wheel 24 are adapted to engage with the teeth of gear wheel 23, acting as a clutch to lock shafts 14 and 15 together for high speed, and its external teeth are adapted to engage with those of gear wheel 36 for intermediate speed. Gear wheel 25 is adapted to engage with gear wheel 37 for low speed and with gear wheel 39 for reverse drive. Gear wheels 24 and 25 have grooved hubs 41 and 42, which are engaged by forked shifting arms 43 and 44 in the usual way. The shifting arms are attached to shifting rods 45 and 46, which have fixed pins 47 and 48 projecting from their adjacent sides, so as to be engaged by the forked end 49 of the gear shifting lever 50.

Figure 5:
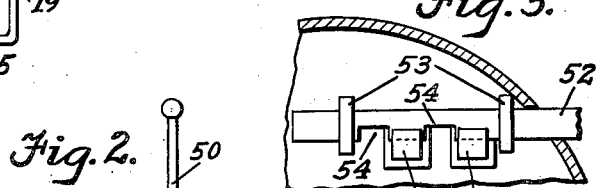
Fig. 5 is an enlarged fragmentary sectional view taken on line 5—5 of Fig. 2, showing in elevation the locking device which holds the gear shifting members against movement.
Figure 2:
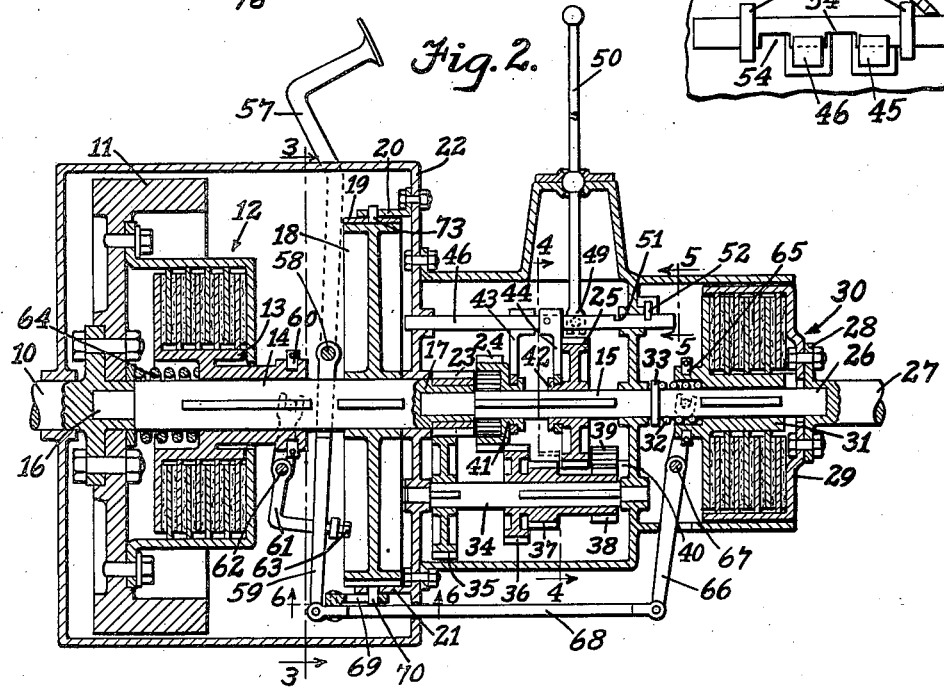
Fig. 2 is a longitudinal vertical section through the transmission case showing more clearly the arrangement of parts illustrated in Fig. 1.
Figure 3:
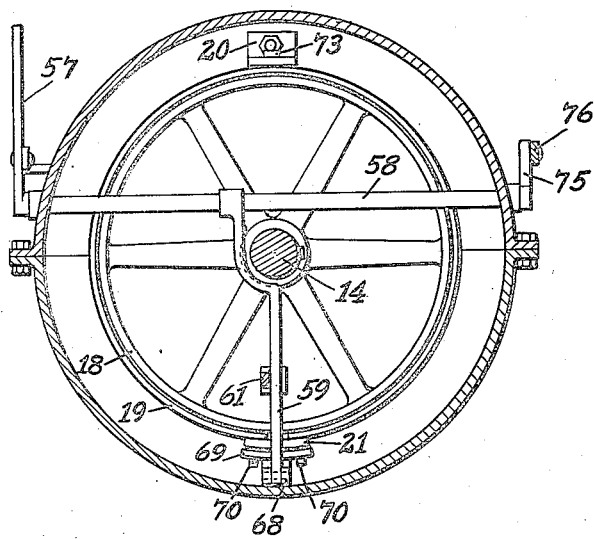
Fig. 3 is a view of a transverse vertical section through the transmission case on line 3—3 of Fig. 2.
Figure 4:
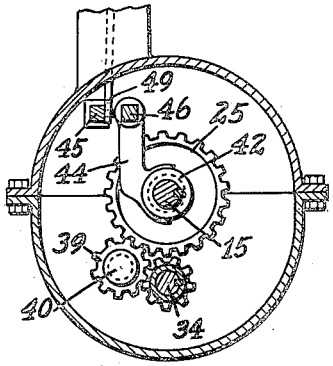
Fig. 4 is a sectional view similar to Fig. 3 taken on line 4—4 of Fig. 2.

The rear ends of shifting rods 45 and 46 are provided with transverse grooves 51 into which a locking bar 52 is adapted to slide. As shown in Fig. 5, locking bar 52 slides in bearings 53 above shifting rods 45 and 46 and has two notches 54 cut in its under side at a distance apart equal to that of the shifting rod centers, so that by shifting the locking bar the notches may be brought over the shifting rods so as to clear them for longitudinal movement; or the bar may be shifted so as to engage the transverse grooves in the shifting rods and hold them against longitudinal movement as shown in Figs. 2 and 5. The outer end of locking bar 52 is pivotally attached to one arm of a bell crank 55, the other arm of which is joined by a connecting rod 56 to lever arm 57 of the brake and clutch pedal.

Arm 57 is attached to a transverse pivot shaft 58 extending through the transmission casing, above intermediate shaft 14 and a downwardly extending arm 59 is fixed to transverse shaft 58 close to shaft 14, said arm 59 being bent so that its lower end is in vertical alignment with the center of said shaft 14. The operation of front clutch 12, the transmission brake and the rear clutch 30 is simultaneously accomplished through the brake pedal by the movement of this downwardly extending arm.

The front clutch 12 is released through a slip ring 60, to which the upper end of a lever 61 is pivotally attached in the usual way, the lever being fulcrumed on a transverse shaft 62 extending through the casing below shaft 14. The lower end of lever 61 is bent so that it terminates behind lever arm 59, and an adjusting screw 63 extends through its end so that the clutch spring 64 acting against clutch member 13 and through slip ring 60 and lever 61 holds adjusting screw 63 in contact with arm 59.

Rear clutch 30 is released by a similar slip ring 65 and lever 66 fulcrumed on a transverse shaft 67, the lower end of this lever being connected to lever 59 by a rod 68.

Figure 6:
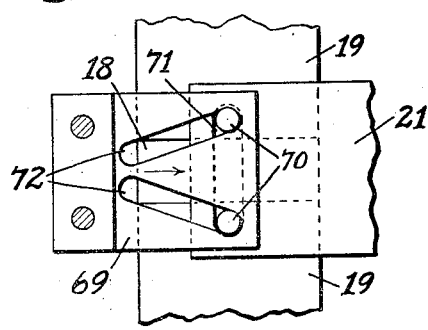
Fig. 6 is an enlarged fragmentary sectional view taken on line 6—6 of Fig. 2, showing details of parts which tighten the brake band.

The brake band 19 is tightened in brake wheel 18 and released therefrom by the movement of a slotted plate 69 attached to connecting rod 68 below bracket 21. Pins 70 projecting through a guide slot 71 in bracket 21 are fixed in the ends of brake band 19. These pins are long enough to extend into cam slots 72 of plate 69 which are formed at such an angle to each other as to pull the ends of the brake band together and thus tighten the band on the brake wheel, when plate 69 is moved rearwardly, and to reverse the operation when the plate is moved forwardly, as is illustrated in Fig. 6. The upper part of the brake band 19 is held in place by a pin 73 fixed to the brake band so as to project upwardly through a hole in bracket 20.

Connection is also made between pedal arm 57 and throttle arm 74. This may be done by a crank 75 fixed on the end of transverse shaft 58 opposite pedal arm 57 and a connecting rod having one end 76 attached to said crank while the other end 77 is attached to crank arm 74 of the throttle. In order to allow for operation of the throttle by the regular throttle lever, the end 77 of this connecting rod is provided with a slot 78 in which crank pin 79 may move when the brake pedal is in its released position.

In order that the throttle arm may be moved by the action of the brake or clutch pedal without moving the throttle lever, an extensible connecting rod 80 made in two parts, is provided; one part 81 of which is attached to the throttle arm 74 by a crank pin 82, and the other part 83 of which is attached directly or indirectly to the usual throttle lever (not shown).

Figure 7:
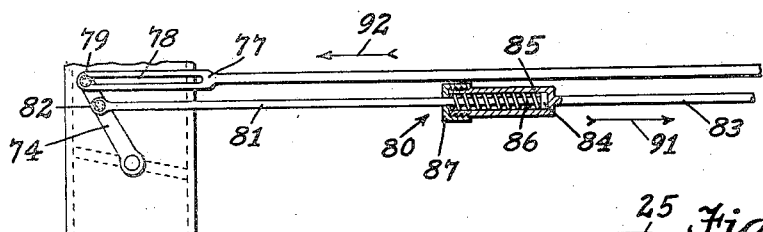
Fig. 7 is a fragmentary and partially diagrammatical view of throttle operating details.

The adjacent ends of the two parts are connected by forming a piston-like disc on the first part and a cylinder 85 on the second part, the disc 84 being adapted to reciprocate within the cylinder 85, with a helical spring 86 under compression between it and a cap 87, which closes the open end of the cylinder and serves as a bearing for the rod 81. (See Fig. 7.) Spring 86 is made stiff enough to resist compression under the pull of the throttle lever and yet weak enough to yield when the brake pedal is operated to close the throttle. Under the influence of this spring the throttle is automatically reopened when the brake pedal is released.

Figure 8:
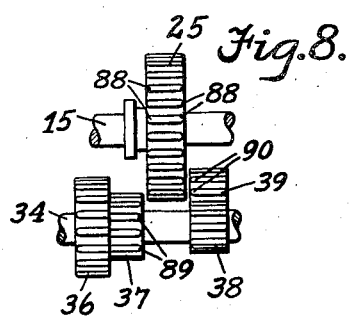
Fig. 8 is a fragmentary view in elevation of gear set parts.

As is shown in Fig. 8 the cogs of gear wheel 25 have their ends rounded as at 88 and the cogs of gear wheels 37 and 39 have their ends on the sides adjacent to gear wheel 25 similarly rounded, as at 89 and 90, to facilitate the engagement of the gears when a shift is being made.

The cogs of gear wheel 24 and gear wheels 23 and 36, with which it engages are similarly rounded.

The operation of the mechanism described is obvious. When the brake and clutch pedal is pushed forward it operates through arm 59 to disengage the front and rear clutches 12 and 30, through levers 61 and 66 respectively, and immediately clamps brake band 19 on brake wheel 18 by the rearward movement of cam plate 69, thus stopping all gear wheels in the gear set. Simultaneously, locking bar 52 is moved out of engagement with shifting rods 45 and 46, through the action of bell crank 55 and connecting rod 56. In case the throttle has been opened by actuating connecting rod 80 in the direction indicated by arrow 91 in Fig. 7, by means of the usual throttle lever, the forward movement of the brake pedal will actuate connecting rod 76—77, through crank 75 in the direction indicated by arrow 92, to close the throttle simultaneously with the other operations described.

The shift of gears may now be made in the usual way, through the manipulation of shifting lever 50. Upon releasing the pedal, clutch springs 32 and 64 act to restore arm 59 and all connected parts to their normal positions as shown in the drawings, reversing the actions described in reverse order.

While the brake as herein shown is placed between the front clutch and the gear set, it is evident that if preferred it might be placed between the gear set and the rear clutch without materially changing the construction.

Having thus described and illustrated my invention, I claim:

1. In combination with an automobile engine, a power transmission comprising a gear set, a front clutch between the driving shaft and said gear set, a brake between said front clutch and said gear set, a rear clutch between said gear set and the driven shaft, means for operating said front and rear clutches simultaneously to release said gear set from both the driving and driven shafts, said means serving to operate the brake immediately after such release to stop the gear set, and means for shifting the movable gears in said gear set while the fixed gears thereof are held from turning by said brake, said movable gears being caused by the friction in said rear clutch, to turn slowly as they pass through their neutral positions into their new engaging positions.

2. In an automobile power transmission the combination with a gear set of a multiple disk front clutch, a brake wheel with a brake band between said front clutch and the gear set and a multiple disk rear clutch; means for operating said front and rear clutches simultaneously to release said gear set from the driving and driven shafts, means cooperative with said clutch operating means for tightening said brake band on said brake wheel immediately after the release of said gear set, means for shifting the movable gears in said gear set while the fixed gears thereof are held from turning by said brake wheel and band, said movable gears being caused by the friction in said rear clutch, to turn slowly as they pass through their neutral positions into their new engaging positions, and means cooperative with said clutch operating means for locking said shifting means after the shift has been made.

3. In combination with an automobile engine, a transmission and control comprising a gear set, a multiple disk front clutch between the engine and said gear set, a brake wheel and band between said front clutch and said gear set, a multiple disk rear clutch between said gear set and the driven shaft, a combined clutch and brake lever adapted to operate said front and rear clutches simultaneously to release said gear set from the driving and driven shafts, said lever being also adapted to tighten said brake band immediately after such release to stop said gear set, means connected to said clutch and brake lever for closing the engine throttle independently of the regular throttle lever, means associated with the regular throttle lever connecting rod for providing the necessary elasticity therein to permit of such independent operation of the engine throttle, means for shifting the movable gears in said gear set while the fixed gears thereof are held from turning by said brake wheel and band, said movable gears being caused by the friction in said rear clutch to turn slowly as they pass through their neutral positions into their new engaging positions, and means connected to said clutch and brake lever for locking said shifting means after the shift has been made.

JEAN A. H. BARKEIJ.